Figure 5:
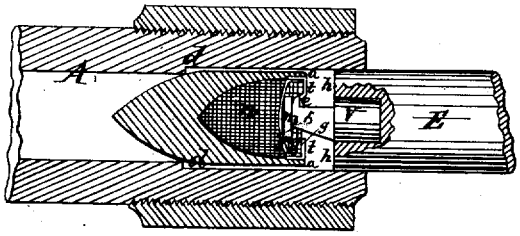

W. C. HICKS.

Breech-Loading Fire-Arms.

No. 5,564. Reissued September 9, 1873.

Witnesses
W. H. Isaac.
John A. Hicks

Inventor
Wm Cleveland Hicks

N. PETERS, Photo-Lithographer, Washington, D. C.

UNITED STATES PATENT OFFICE.

WILLIAM CLEVELAND HICKS, OF SUMMIT, NEW JERSEY.

IMPROVEMENT IN BREECH-LOADING FIRE-ARMS.

Specification forming part of Letters Patent No. 16,797, dated March 10, 1857; Reissue No. 1,952, dated May 9, 1865; Reissue No. 3,798, dated January 18, 1870; Reissue No. 3,860, dated March 1, 1870; extended seven years; Reissue No. 5,564, dated September 9, 1873; application filed September 1, 1873.

*To all whom it may concern:*

Be it known that I, WM. CLEVELAND HICKS, formerly of New Haven, in the State of Connecticut, now of Summit, in the State of New Jersey, have made an invention of a new and useful Improvement in Fire-Arms; and that the following is a full, clear, and exact description and specification of the same.

My invention appertains to that class of breech-loading fire-arms in which the barrel is rigidly attached to the breech-frame, with which the lock mechanism is connected, and the breech is closed by the movement of a breech-piece, which is so combined with the breech-frame and barrel that its front surface moves forward toward the muzzle of the barrel during its closing movement.

Previous to my invention such fire-arms had been loaded with a shell or cartridge having at its butt an annular flange, one of whose rims was fast to the cylindrical portion of the cartridge-shell; but, so far as my knowledge extends, no means existed for withdrawing the uninjured or unfired cartridge from such a fire-arm by a continuous movement of the hand which opened the breech, before letting down the hammer.

The object of my invention is, primarily, to extract surely and rapidly from the breech of such a fire-arm the unfired cartridge, as well as the remnant of a cartridge which may remain after firing; and secondly, to insure the explosion of the percussion-primer of the cartridge; to these ends my invention consists of certain combinations and arrangements of the parts of a fire-arm, which are specified at the close of this specification.

The said parts are the following, viz: The barrel, constructed with an enlargement or chamber at its butt to hold the cartridge and rigidly secured to the breech-frame, so that these two do not move relatively to each other during the operations of loading, firing, and extracting the cartridge or its remnant. One or more extractors, arranged to have a reciprocating movement forward (by which I mean toward the muzzle of the barrel) and backward, (or toward the butt of the breech-frame,) the said extractor being also arranged, relatively to the wall of the chamber of the barrel, so that when the extractor is in its most forward position its bill or operating extremity is directly in front of the annular space occupied by the flange of the unfired shell or cartridge, so that when the extractor is moved backward, the flange of the cartridge being in its path, is, of necessity, compelled to move with it, so that the cartridge will be extracted from the cartridge-chamber, although no attempt may have been made to fire it or to let down the hammer of the lock. The reciprocating breech-piece for closing the butt of the cartridge-chamber is so arranged that its front surface, which operates to close said butt, moves forward toward the muzzle of the barrel during the latter part of its closing movement.

By my first combination the said three parts are so combined that the said forward closing movement of the said breech-piece, and the forward movement of the said extractor to its position in front of the annular space occupied by the cartridge-flange when the cartridge is held in the chamber of the barrel ready for firing, are effected simultaneously by one movement of the hand of the operator without the necessity of moving the hammer for the purpose of effecting the engagement of the extractor with the cartridge-flange, or of firing the cartridge to cause its flange to expand and engage with the extractor.

When two extractors are used I so arrange them relatively to the chamber of the said barrel that they will both engage in the same direction with the flange of the cartridge, so that when it is extracted it may be readily disengaged from both extractors.

For the purpose of firing the cartridge I have constructed the extractor so that it may perform the two functions of extracting the cartridge and transmitting the blow of the hammer to the percussion-primer of the cartridge, and have so combined it with the barrel and breech-piece and breech-frame that the extractor may be driven forward by the hammer for the purpose of exploding the primer after the breech has been closed.

My invention is applicable to various constructions of breech-loading fire-arms of the above-mentioned class; and in order that I may be fully understood I may refer to a pistol manufactured at about the date of my application for my original patent, by the Volcanic Repeating Arms Company, with my improvements applied thereto, said pistol being in other respects substantially the same as that described in the patent granted to Horace Smith and D. B. Wesson the 14th day of February, A. D. 1854. I will describe, also, such parts of said pistol as are important to a clear understanding of my invention.

Figures 1 to 5 inclusive represent views of parts of the pistol detached from the residue and considerably enlarged.

Figures 1, 2, 3, 4:
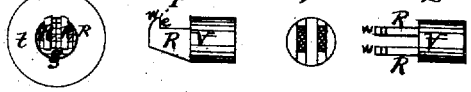

The said pistol has a barrel, A, which is constructed to be loaded at the breech with a cartridge, such as is represented in Figs. 4 and 5, having at its butt an internal brass flange, *t*, which, being elastic, yields when pushed forward by an inclined instrument, and tends to regain its original position when the instrument has passed by it. The percussion-primer *m* has the form of a cake, which is supported near the powder *n* by a steel disk, *s*, and is covered by a thin disk of cork, *g*. The barrel A of the pistol is secured rigidly to the breech-frame of the fire-arm, which is connected with the lock-mechanism, so that the barrel and the breech-frame are not moved relatively to each other for the purposes of loading, firing, and extracting the cartridge of the fire-arm. The barrel also has, at its rear end, an enlarged chamber, *h*, for the reception of the cartridge, and for holding it during firing. The cartridge is pushed into the chamber by means of the breech-pin or breech-piece E, operated by means of a lever for the purpose of moving said breech-pin and its connections to and fro, so that during the closing movement the front or closing surface of the breech-pin is moved forward toward the muzzle of the barrel. The pistol is fired by the operation of a hammer, which is arranged to operate through the intervention of the breech-pin and its appurtenances upon the primer in the cartridge, the hammer being arranged to strike against the rear end of the breech-pin. The construction of the cartridge and the mode of firing it being such as above stated, my improvements were applied to the pistol, in the mode represented in the accompanying drawings, as follows: As the cartridge used with the pistol has an internal flange whose outer rim is fast to its cylindrical body, while its inner rim is free, the extractor R was adapted to take hold of that inner rim, and was attached to the forward end of the breech-pin, (although such attachment does not constitute a distinguishing characteristic of my invention.) Moreover the construction of the cartridge with an internal flange enabled me to use the extractor as the striking instrument for striking the percussion-primer within the cartridge by so combining the breech-pin and extractor with the barrel that the first two might be driven forward by the hammer after the breech was closed and the extractor was placed in front of the space occupied by the flange of the cartridge. Two extractors also were used to insure firing.

As the flange *t* of the cartridge used with the pistol is made of elastic metal, which will yield to permit the bills of the extractors to pass by it, the extractors were made rigid by being formed upon a cylindrical plug or stock, V, and were connected with the breech-pin by driving said stock V into a socket formed in the front end of the breech-pin.

As the breech-pin is connected with a lever, the extractors, being connected with the breech-pin, are combined with the said lever, so that when the lever is turned in one direction the extractors are moved forward, and when the lever is moved in the opposite direction the extractors are withdrawn. Each extractor is so arranged relatively to the cylindrical wall of the cartridge-chamber that when the bill *w* of the extractor is advanced to its most forward position it is in front of the annular space occupied by the flange of the cartridge when in the cartridge-chamber, so that if the said bill be moved backward the flange of the cartridge is in its path of movement, and cannot escape being operated upon by the extractor when the latter is drawn backward; consequently the backward movement of the extractor will withdraw the cartridge. Moreover, although two extractors are used, the two are arranged to operate or act at one side only of the flange of the cartridge, their bills both pointing in the same direction, so that when the cartridge is withdrawn from the chamber it may be readily disengaged from the bills of the extractors by moving the cartridge in the plane of the profile of the shoulders of the bills, which could not readily be done if the two extractors, when two are used, were so arranged at opposite sides of the cartridge-flange as to hold the cartridge between them.

When the pistol is to be loaded the movement of the lever opens the breech by moving the breech-pin or breech-piece backward, and withdraws the extractors, while the movement of the lever in the opposite direction first impels the cartridge into the chamber of the breech. When, however, the cartridge reaches the shoulder *d* at the front end of the chamber its forward movement is stopped, and then the continued movement of the lever impels the extractors forward past the edge of the flange *t*; and, as the point of each is inclined or sloped off in advance of its shoulder, the bill of the extractor readily passes over the edge of the flange which, being of thin metal, yields to the pressure of the bill, and permits it to move forward toward the muzzle when the bill has passed by the edge of the flange *t*. The latter, being elastic, tends to resume its original position, so that the bill of the extractor, when moved forward, is directly in front of the annular space occupied by the flange, and so that, if the lever be then moved to open the breech, the hooks will extract the cartridge, by reason of their engagement with its flange.

It will be noticed, also, that the forward movement of the closing-surface of the breech-pin in closing the butt of the cartridge-chamber, and the forward movement of the extractor to its position in front of the annular space occupied by the flange of the cartridge, being both effected by the movement of the same lever, are effected simultaneously, and without the operation of the hammer, which meanwhile has remained stationary.

In the volcanic fire-arm referred to, the construction of the cartridge with a thin flexible flange permits the extracting-hook to be rigidly secured to the breech-pin; but this feature is not claimed as a peculiarity of the invention.

The construction of the cartridge with an internal flange, and with the primer arranged in its interior in the line of the movement of the point of the extractor after the passing of the flange, enables the extractor to be used as the striking instrument for transmitting the blow of the hammer to the primer *m*, although this use of the extractor does not effect in any manner its operation in extracting a cartridge, and is not essential to it; but the movement of the breech-pin or breech-piece forward toward the muzzle of the barrel during its movement for closing the cartridge-chamber is a distinguishing feature of the invention, and is important, because it insures the shoving of the cartridge home in the breech in case the operator has not so placed it by his hand.

The reason why two striking instruments are used and are an improvement upon one is as follows: When a single striking instrument is used the cake of the percussion powder forming the primer, being struck at about its center, frequently splits into parts, and allows the striking instrument to pass between the parts without striking them against the disk support of the primer; hence the fire-arm frequently fails to discharge; but two striking instruments will hold some portion of the cake between their points, so that it cannot escape, and consequently some portion of it is certain to be struck between the points of the striking instruments and the disk support, and the fire-arm is sure to fire.

The other parts of the pistol to which my improvements were first applied, and which was manufactured by the Volcanic Repeating Arms Company at the time previously referred to by me, are the same in construction and operation as the corresponding parts described in said patent of Smith & Wesson, February 14, 1854.

In the latter fire-arm, as constructed previous to my invention, two extracting-hooks were made and used; but they were so arranged that, when advanced, their bills were radially outside of the periphery of the cartridge-flange, and were not in front of it or of the annular space occupied by it when the cartridge was in the cartridge chamber; consequently they could be moved backward without engaging with the flange unless the butt of the cartridge was expanded by the blow of the striking instruments, so as to force the parts of the butt within the lines of travel of the hooks; hence the loaded cartridge could not be withdrawn by the hooks without first operating the hammer to spread the butt of the cartridge; whereas the bill of my extractor, when moved forward, is directly in front of the annular space occupied by the flange of the cartridge, when the cartridge is held for firing; consequently, it must of necessity engage with that flange when the extractor is moved backward, whether the cartridge has been fired or not; and, therefore, my extractor can be used to withdraw a loaded cartridge.

Having now fully described the form in which I first applied my improvements, I claim as my invention and desire to secure by Letters Patent—

1. The combination, substantially as before set forth, of the following three elements, viz: First, the barrel, rigidly attached to the breech-frame, and constructed with a chamber for holding the cartridge; second, the reciprocating breech-piece, operating relatively to the barrel and breech-frame, in such manner that its front surface moves forward toward the muzzle of the barrel during its closing movement; third, the reciprocating extractor, so connected with the said reciprocating breech-piece that the said forward closing movement of the front surface of the breech-piece, and the forward movement of the extractor to a position in front of the annular space occupied by the flange of the cartridge, when held in the said chamber ready for firing, may be effected simultaneously by one movement of the hand, so that the unexpanded cartridge may be withdrawn by the engagement of the bill of the extractor with its flange, in case the said breech-piece be withdrawn before attempting to fire or before letting down the hammer.

2. The combination, substantially as before set forth, of the reciprocating breech-piece, arranged as before set forth, the barrel rigidly attached to the breech-frame, and constructed with a chamber for holding the cartridge, and two extractors arranged in such manner that their operating ends extend in the same direction, so that the cartridge-flange is not clasped between them, and can be readily disengaged from them after its extraction from the said chamber.

3. The combination and arrangement, substantially as before set forth, of the extractor, the breech-piece, and the barrel, in such manner that the extractor may be driven forward by the hammer after the breech is closed, and that the extractor performs the two functions of transmitting the blow to the primer, and of extracting the cartridge or remnant of the cartridge from the breech of the firearm.

WM. CLEVELAND HICKS.

Witnesses:

JAMES M. HICKS,

W. L. BENNEM.